US005350953A

United States Patent [19]

Swenson et al.

[11] Patent Number: 5,350,953

[45] Date of Patent: Sep. 27, 1994

[54] DIGITALLY WEIGHTED NEURON FOR ARTIFICIAL NEURAL NETWORK

[76] Inventors: Richard M. Swenson, P.O. Box 470, Ridgecrest, Calif. 93555; John C. Cole, III, 7417 92nd Pl. S.E., Mercer Island, Wash. 98040; Steve L. Holmes, 2514 230th Ave. NE., Redmond, Wash. 98053; Paul B. Ekas, 11810 28th Ave. SW., Seattle, Wash. 98146

[21] Appl. No.: 69,943

[22] Filed: May 28, 1993

[51] Int. Cl.[5] ...................... H03K 19/23; H03K 19/08

[52] U.S. Cl. .................................... 307/464; 307/201; 395/21; 395/27; 364/807

[58] Field of Search ...................... 307/201, 464, 474; 395/21, 24, 27; 364/807, 274.6

[56] References Cited

U.S. PATENT DOCUMENTS

| | | | |
|---|---|---|---|
| 3,506,845 | 4/1970 | Winder | 307/464 |
| 4,951,239 | 8/1990 | Andes et al. | 364/807 |
| 5,004,932 | 4/1991 | Nejime | 307/464 |
| 5,016,211 | 5/1991 | Jeong | 395/27 |
| 5,028,810 | 7/1991 | Castro et al. | 307/464 |
| 5,053,645 | 10/1991 | Harada | 307/464 |
| 5,061,866 | 10/1991 | El-Naggar et al. | 395/24 |
| 5,093,900 | 3/1992 | Graf | 395/27 |
| 5,150,450 | 9/1992 | Swenson et al. | 395/23 |
| 5,222,195 | 6/1993 | Alkon et al. | 395/27 |
| 5,253,330 | 10/1993 | Ramacher et al. | 395/27 |

OTHER PUBLICATIONS

Mark Hollar, Simon Tam, Hernan Castro, and Ronald Benson; "An Electrically Trainable Artificial Neural Network (Etann) With 10240 'Floating Gate' Synapses"; International Joint Conference On Neural Networks; Washington, D.C.; Jun. 18-22 1989; vol. II, pp. 191-196.

*Primary Examiner*—Edward P. Westin
*Assistant Examiner*—Richard Roseen
*Attorney, Agent, or Firm*—Stephen J. Church; Melvin J. Sliwka; John L. Forrest, Jr.

[57] ABSTRACT

A neuron for an artificial neural network provides digital weighting of input signals at a common portion of the neuron rather than at each synapse. The neuron is adapted for use of differential signals, and the weighting may be provided by field effect transistors of different widths, by subtracting a plurality of differential signal components from an opposite most significant component, or by subtracting one half of a differential signal component from the opposite next most significant component. The neuron may provide binary sign selection and digit selection by switching input and reference signals at each synapse.

12 Claims, 6 Drawing Sheets

FIGURE I

DIGITALLY WEIGHTED NEURON FOR ARTIFICIAL NEURAL NETWORK

BACKGROUND OF THE INVENTION

1. Field of the Invention

This invention pertains to the field of pattern recognizers or artificial neural networks capable of supervised or unsupervised learning. More particularly, it pertains to such networks having neurons with digital weighting.

2. Description of the Prior Art

The general theory and operation of artificial neural networks (ANN) together with their existing and potential uses, construction, and methods and arrangements for learning and teaching have been extensively described in publicly available literature and need not be repeated herein However, U.S. Pat. No. 4,951,239, which issued Aug. 21, 1990, and U.S. Pat. No. 5,150,450, which issued Dec. 24 1991, describe aspects of artificial neural networks useful as a background of the present invention. Accordingly, these patents of which one of the present coinventors is also a coinventor, are incorporated herein by reference.

For the purposes of the present invention it is only necessary to realize that an ANN has a plurality of "neurons" each having a plurality of "synapses" individually receiving input signals to the network. Each synapse weights its received input signal by a factor, which may be fabricated into the network, may be loaded later as part of a predetermined set, or may be "learned". The synapses generate weighted signals which are summed by a common portion of the neuron, often termed the "neuron body" to generate a sum signal which, typically, is output by the neuron body after modification by a sigmoid or other "activation function" which is not involved in the present invention.

For practical use an ANN has on the order of at least a hundred neurons each with on the order of a hundred or more synapses. It is, therefore, apparent that even with a very large scale integrated (VLSI) circuit it is important that the elements of each body and, especially, each synapse be of simple, compact, and regular configuration.

Prior art artificial neural network neurons have been implemented with a variety of weighting arrangements which, while generally effective, have various deficiencies such as lack of resolution, particularly over time and with repeated changes. This deficiency is avoidable by the use of synapses with digital weighting. However, since resolution to one part in 256—the integer two to the eighth power—or more is typically necessary for practical use of an ANN, it is apparent that providing such weighting at each synapse, as by field effect transistors (FET) having different widths corresponding to powers of two or some other number, requires elements of different sizes with the more significant digits having elements on the order of several hundred times larger than corresponding elements for the least significant digit. The use of such large elements and of such varying sizes in the synapses would result in impractically large circuits.

With VLSI circuits, temperature and fabrication variations across a chip result in different characteristics for transistors at different portions of the chip. These variations, as well as noise from adjacent elements, can easily result in different synapses of even the same neuron having weight differences exceeding the necessary resolution. While such differences might be avoided by techniques such as the use of differential signals, insofar as known to applicants no circuits exist which use these techniques and yet provide the necessary resolution, compactness, dependability, and simplicity provided by the present invention for practical implementation of an ANN.

Since the synapse weights of an ANN may, for different applications, be unmodifiable after initial fabrication in a VLSI or other circuit; be generated after fabrication but not be readily changed after generation; or be readily changed, as by switching, when in use and as required in learning, it is essential that circuits providing such weights be adapted to not only provide the necessary resolution, temperature and fabrication variation immunity, and configuration for VLSI or other implementation; but be adapted to constructions providing the requisite fixed or modifiable weights. Insofar as known to applicants there exist no neuron circuits providing these features and the advantages provided by the present invention and also usable in a practical artificial neural network.

SUMMARY AND OBJECTS OF THE INVENTION

The present invention provides a an artificial neural network neuron wherein digital weighting of input signals is effected at a common portion of the neuron rather than at each synapse thereof. The neuron is particularly effective with differential signals. The weighting may be provided by field effect transistors of different widths; by subtracting the lesser significant signal components of one differential set from the opposite most significant component; or by, in effect, subtracting one half of each differential signal component from the opposite next most significant component. The neuron may provide binary sign and "one" or "zero" digit selection by switching of input and reference signals at each synapse.

It is an object of the present invention to provide an artificial neural network neuron providing precise weighting and summing of input signals.

Another object is to provide such a neuron adapted to and effective with very large scale integrated (VLSI) circuits, particularly such circuits constructed by complimentary metal oxide semiconductor (CMOS) techniques.

Still another object is to provide such a neuron which retains its precision in an integrated circuit having temperature and fabrication variations.

Yet another object is to provide such a neuron adapted for elements which are simple, compact, and regular when the neuron is implemented with similar neurons and other components in an integrated circuit.

A further object is to provide such a neuron having synapses providing digital weighting wherein the elements associated with each of the digits are of substantially the same size.

Additional objects are to provide artificial neural network neurons providing the above and other advantages and which are economical to construct, dependable in operation, and fully effective.

BRIEF DESCRIPTION OF THE DRAWINGS

Other objects, advantages, and novel features of the present invention will be apparent from the following detailed description when considered with the accompanying drawings wherein.

DETAILED DESCRIPTION

Simplified Embodiment

Figure 1:
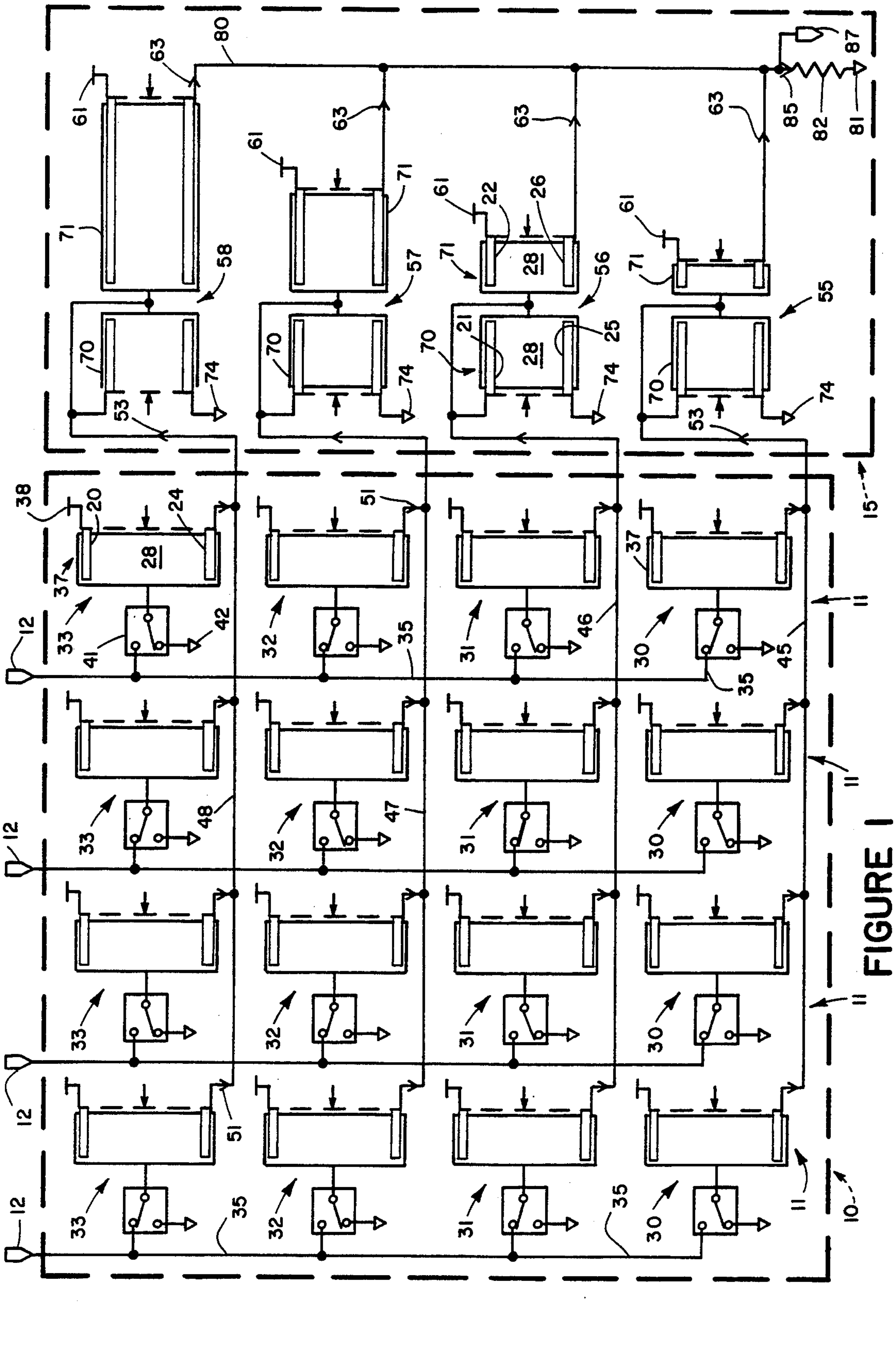
FIG. 1 is a diagram of a simplified artificial neural network neuron embodying the principles of the present invention by the use of digital weighting in the neuron body, the weighting being provided by adding currents from field effect transistors of different widths.

FIG. 1 shows a neuron for an artificial neural network. The neuron, which utilizes the principles of the present invention in a particularly simple arrangement, has a synapse section 10 having four synapses 11 each receiving an input signal 12. For simplicity in exposition, section 10 has only four synapses instead of the before mentioned much larger number typical of a practically useful artificial network. The neuron also has a neuron body section 15 providing summing and binary weighting in accordance with the present invention, other functions typically provided by a neuron body being omitted for simplicity and as not involved in the present invention. Also for simplicity, the FIG. 1 neuron has binary weighting to only four bits or digits instead of the eight bits typically required, does not provide negative weighting, does not include biasing and other well-known electronic design features typically provided to improve linearity and the like, and utilizes only well-known n-channel, enhancement-mode field effect transistors (FET's) where increasingly positive input voltages to a FET transistor typically result in increasing current through the transistor.

The principles of the present invention are shown in the figures and are described as these principles might be utilized in preferred and other embodiments using analog input and output signals, using the binary number system, and using FET's adapted for well-known complimentary metal oxide semiconductor (CMOS) techniques with which the present invention is particularly effective. However, it will be apparent to those skilled in the artificial neural network and electronic arts that, by the use of suitable multipliers, the present invention may be employed with other number systems, such as the decimal system, and with digital signals. It is also apparent that the invention may be implemented by other kinds of transistors or other electronic weighting and switching devices.

In general the usual schematic symbols are utilized for transistors and other electronic devices in the figures of the present application. However, the principles of the present invention are conveniently set forth in the figures by the use of FET features indicated in FIG. 1 where certain transistors are represented as sources 20–22 and drains 24–26 juxtapositioned to and in front of associated gates 28 and where, as with certain transistors depicted in the other figures, these source, drain, and gate elements are represented as extending from the corresponding portions of the usual symbols. A first transistor with source 20 and drain 24 has these elements spaced relatively far apart, as in an actual FET structure, to suggest greater linearity of the current controlling action of this transistor in relation to variations of the voltage on its gate 28 than is provided by, for example, the transistors with sources 21 and 22 more closely spaced. It is well-known to utilize a transistor, such as the first transistor, to provide a multiplying action in which, within limits, the current from source to drain effectively changes in direct proportion to changes in the gate voltage. Also in accordance with actual FET structure, source 21 and drain 23 of a second transistor are substantially wider—approximately two times—than source 23 and drain 26 of a third transistor, which is connected in well-known current mirror relation to the second transistor. In this relation, the gates of the transistors are directly connected to each other and, in the depicted n-channel transistors, to the source 21 of the second transistor. As a result and in accordance with the relative widths of the two transistors, the third transistor passes substantially one-half of whatever current is being passed by the second transistor, since the gate width of the third transistor is about one-half that of the second transistor.

Each synapse 11 has four substantially identical synapse digit weighters 30–33 corresponding, respectively, to the least through the most significant of the four bits to which each synapse is adapted and thus corresponding to the binary number system positional values 1, 2, 4, and 8 which are powers of the integer two. In depicted embodiments of the present invention the input signals 12 are analog signals in which a predetermined voltage range represents desired values, and each weighter receives the input signal 12 of its synapse through a conductor 35 extending through the synapse. Each weighter has a multiplying field effect transistor 37 substantially identical to the above-described first transistor having source 20 and drain 21. The source of each transistor 34 is connected, as indicated by numeral 38, to a common positive voltage supply for the neuron. Each weighter has a switch 41, represented by the usual symbol, for selectively connecting the gate of transistor 37 either to input signal 12 or, as indicated by numeral 42, to the common ground connection.

Switches 41 represent the concept that each weighter 30–33 provides a "one" as when each switch connects its corresponding transistor 37 to an input signal 12 or a "zero" as when the switch connects this transistor to ground 42. As before, stated this concept may be provided by switching provided in any way; for example, while the neuron is in operation—possible with the neuron of FIGS. 4—or, for another example, may be provided by connections fabricated into an integrated circuit and subsequently unchangeable. To indicate the provision of different weights by a synapse of the present invention, the switches of the FIG. 1 synapses 11 are depicted in various positions. For example, the left hand synapse has its switches set to correspond to the binary number "1010".

The FIG. 1 neuron has four digit summing busses 45–48 corresponding, respectively, to weighters 30–33 and thus corresponding to the digit positions of the four bit binary numbers for which synapses 11 are adapted.

Each bus 45–48 extends through corresponding set of the weighters 30–33 to the neuron body 15. At the weighters, the drains of the four transistors 37 corresponding to each bus are connected thereto so that each bus receives from each connected weighter a synapse digit position signal indicated by numeral 51. It is apparent that, when the source of a transistor 37 is connected to ground 42 by the associated switch 41, the transistor conducts no current so that the signal 51 represents zero. However, when the source of a multiplying transistor 37 of a weighter 30–33 is connected to the corresponding input signal 12, the signal 51 from the transistor is a current representing the product of value of the corresponding input signal 12 and the weight value of "one" provided by the weighter. This weight value is, of course, one or zero in the case of the depicted binary elements. However, it is evident that if the principles of the present invention are utilized in a neuron employing the decimal system for example, each signal corresponding to a signal 51 would have values corresponding to the product of one of the decimal digits, zero through nine, times the value represented by an input signal corresponding to a signal 12.

It is apparent that, by providing suitable and subsequently described connections to ground in neuron body 15, the synapse digit position current signals 51 connected to each bus 45–48 add directly therein. The bus thus generates a digit position sum signal 53 which is substantially the arithmetic sum of the signals 51 connected to the bus and which corresponds to the binary digit position with which the bus is associated. It is significant that, although the weighters 30–33 correspond in their numerical order to increasing weight to be given to their signals 51, all of these weighters employ elements, particularly the transistors 37, which may be substantially identical, both in the figures of the present application and in integrated circuits or other electronic devices actually embodying the present invention.

The neuron body 15 has four digit position or positional weighting current mirrors 55–58 corresponding, respectively, to busses 45–48 and to each set of weighters 30–33. These current mirrors thus correspond to the digit positions of the four bit binary numbers for which synapses 11 are adapted. Each positional weighting current mirror 55–58 is connected to the corresponding one of the busses 45–48 and receives the current of the signal 53 on the bus. Each current mirror 55–58 is connected, as indicated by numeral 61, to a common positive voltage supply for the neuron and generates therefrom a weighted digit position current signal 63 proportional to the product of the corresponding signal 55 and the positional value —1, 2, 4, or 8—of the binary digit to which the current mirror corresponds.

Each current mirror 55–58 has an input FET 70 and an output FET 71 connected in a current mirror relation in which the gates 28 of the FET's are connected to each other, to the source 21 of the input transistor, and to the corresponding one of the buses 45–48. The drain 23 of each input transistor is connected, as indicated by numeral 74, to a common ground for the FIG. 1 neuron so that the input transistor drains the current of the one of the signals 55 corresponding to the input transistor, this current being the sum of the signals 51 corresponding to the same binary digit position as the current mirror having the input transistor. As a result of the current mirror relation, a current from supply 61 to the source 22 of the output transistor 71 is provided from the output transistor drain as the corresponding weighted digit position current 63. As shown in FIG. 1, the widths of the input transistors 70 are substantially the same for every current mirror, a representative and relative width of four arbitrary units being shown. However, the widths of the output transistors 71 are substantially proportional to the respective positional values —1, 2, 4, or 8—of the binary digit to which the current mirror corresponds. As a result and in accordance with the relative widths of the input and output transistors, the output transistors provide, respectively, 25%, 50%, 100%, and 200% of the currents provided as signals 53 to the input transistor current mirror connected to the output transistor. Each of the signals 63 thus corresponds to the product of the associated signal 53 times the positional value or weights of digits in the binary number system of the digit position to which the signal 63 corresponds.

The FIG. 1 neuron has a sum signal bus 80 connected, as indicated by numeral 81, to the common ground of the neuron through a suitable resistor 82. Bus 80 is also connected to the current mirror output transistors 71 so as to receive all of the currents 63 therefrom for drain to the ground 81. Currents 63 thus add directly in bus 80 so that the bus generates a neuron sum current signal 85 which is substantially the arithmetic sum of the signals 63. Current signal 85 is converted by resistor 82 to an analog voltage output signal 87 of the neuron. It is evident that signals 85 and 87 correspond to the sum of the products of the each of the digit position sum signals 53 and the positional values in the binary system corresponding to the signals 53. As a result, the signals 85 and 87 represent the sum of products of the input signals 12 and weights represented in the binary number system by the positions of switches 41 which receive the input signals.

Embodiment with Differential Signals

Figure 2:
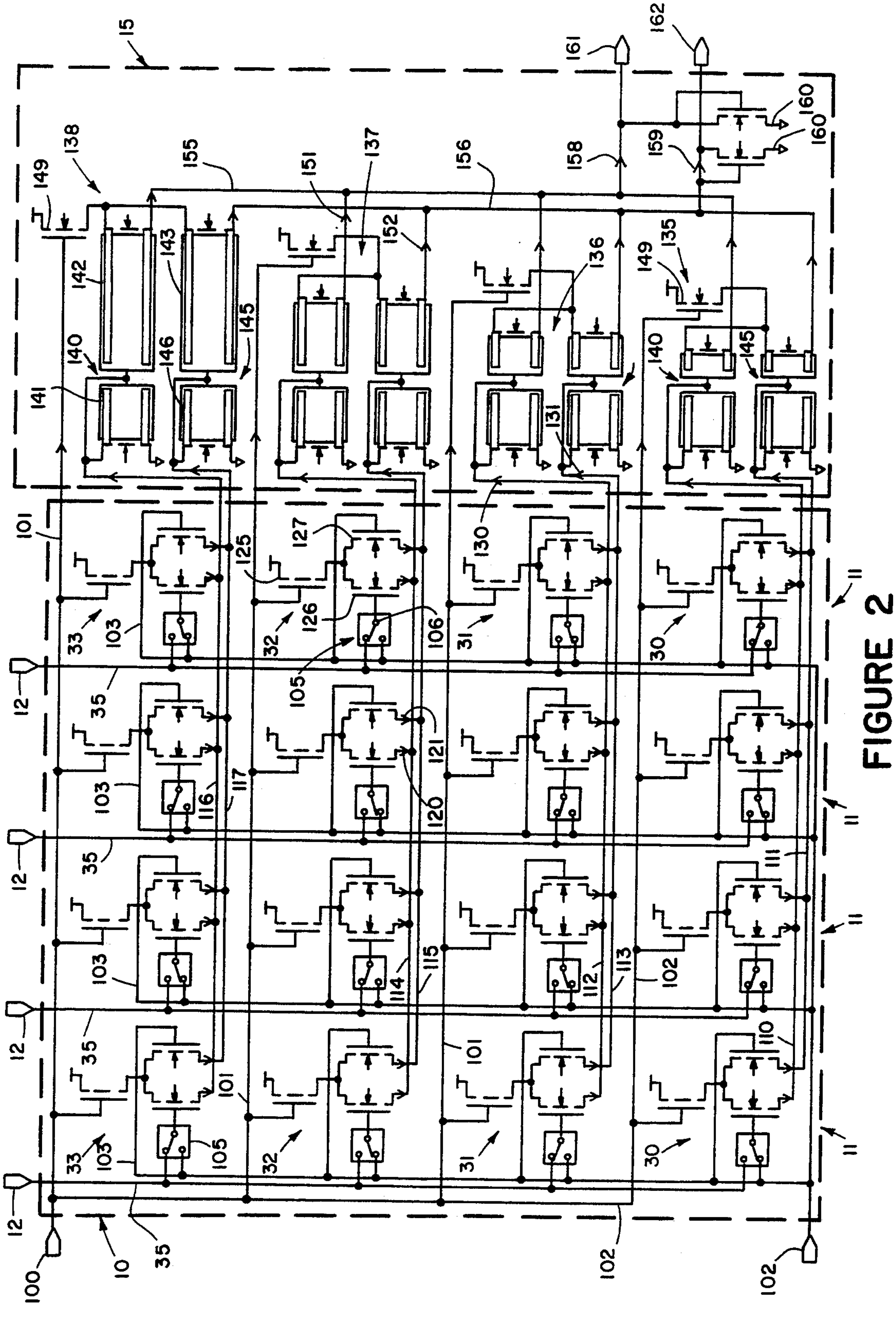
FIG. 2 is a diagram of a neuron similar to that of FIG. 1, but employing differential signals.

FIG. 2 is a diagram of a neuron similar to that of FIG. 1, but employing differential signals and other electronic design features providing, in relation to the simplified FIG. 1 neuron, greater linearity and tolerance to fabrication and temperature variations across an integrated circuit having a neuron embodying the present invention. The FIG. 2 neuron is like the FIG. 1 neuron in also having a synapse section 10 with four synapses 11 each receiving an analog input voltage signal 12, in having a neuron body section 15, and in each synapse having four substantially identical synapse digit weighters 30–33 corresponding to the binary number system positional values 1, 2, 4, and 8. However, the FIG. 2 neuron has a connection 100 and a conductor 101 extending therefrom through each synapse and the neuron body for a bias voltage to provide, in a well-known manner, for operation of elements of the neuron in linear regions. The FIG. 2 neuron also has a connection 102 from which a conductor 103 extends through each synapse to provide a reference voltage which may be varied in a well-known manner to select neural network characteristics of the neuron.

Each of the FIG. 2 weighters 30–33 has a switch 105, corresponding to a FIG. 1 switch 41, for selectively connecting a terminal 106 of the switch 105 to the corresponding input signal 12, so that the weighter provides a "one" or to the reference voltage conductor 103 so that the weighter provides a "zero". As with switches 41, the switches 105 represent the concept of switching which may be provided in any suitable manner.

The FIG. 2 neuron has eight sum digit signal component buses 110–117 disposed in pairs 110 and 111, 112 and 113, 114 and 115, and 116 and 117, these pairs corresponding respectively to and extending through each of the sets of weighters 30–33. Busses 110, 112,114, and 116 receive first or positive component currents 120 of a differential digit sum signal and busses 111, 113, 115, and 117 receive second or negative component currents 121 of this signal which is defined by the difference between the currents. It is typically considered that, when both component currents are equal, they define a differential signal corresponding to zero and that, when the positive current is greater, the components define a positive signal. Although not a feature of the FIG. 2 embodiment, it is apparent that, when such a negative component or current is greater than the positive, the components may be considered as defining a negative signal.

Each weighter 30–33 of the FIG. 2 neuron has a bias transistor 125 connected, as indicated by numeral 126, to the common voltage source so as to provide a current, which is predetermined by the bias voltage on conductor 101, for division as determined by an input signal transistor 126 as the corresponding positive component 120 to bus 110, 112, 114, or 116 and as determined by a reference signal transistor 127 as a reference component to the corresponding negative component bus 111, 113,115, or 117. Transistors 126 and 127 are multiplying FET's corresponding to the FIG. 1 transistors 37. The gate of each transistor 126 is connected to the switched terminal 106 so as to receive either the selected input signal 12 or the reference voltage from conductor 103; however, the gate of each transistor 127 is always connected to the reference voltage. As a result and at each weighter 30–33 of the FIG. 2 embodiment, component current 121 is affected by fabrication and temperature characteristics of the weighter while component current 120 has imposed on such current the effect of the either the corresponding input signal 12, when the weighter provides "one" or a "zero" effect, when the reference voltage is connected to transistor 126. The effect of the fabrication and temperature characteristics are thus minimized in the signal defined by the difference of currents 120 and 121. As with busses 45–48, the currents 120 and 121 from each set of weighters 30–33 are summed substantially arithmetically in the associated buses 110–117 corresponding to the same digit positions as the weighters. As a result and in effect, busses 110, 112,114, and 116 each generate a first or positive digit position sum current or component 130 corresponding to the sums of the currents 120 from the associated weighters 30–33 and busses 111, 113, 113, and 117 each generate a second or negative digit position sum current or component 131 corresponding to the sums of the currents 121 from the associated weighters. As a result, each pair of sum currents or components 130 and 131 also define a differential current signal having the above-described characteristics of a current component pair 120 and 121. It is significant that all of FIG. 2 weighters 30–33 employ elements, such as the transistors 126–127, which may be substantially identical in every weighter.

The FIG. 2 neuron body section 15 receives the differential signals defined by currents 130 and 131 on bus pairs 110 and 111, 112 and 113, 114 and 115, and 116 and 117 and weights the signals proportionally to the positional values 1, 2, 4, and 8 of the binary digits to which the bus pairs correspond. To provide this weighting the neuron body has four digit position weighting circuits 135–138 corresponding, respectively, to the bus pairs.

Each of the circuits 135–138 has a positive component current mirror 140 formed by an input FET 141 and an output FET 142, and has a negative component current mirror 145 formed by an input FET 146 and an output FET 147. All of the eight input transistors 141 and 146 have the same width. In each circuit 135–138, the two output transistors have the same width; but this width is varied, as with the FIG. 1 current mirror output transistors 71, proportionally to the positional value of the binary digit to which the output transistors correspond. Each current mirror 140 or 145 is similar to one of the FIG. 1 current mirrors 55–58 in that the gates of the input and output transistor pairs are connected to each other, to the source of the input transistor, and to the corresponding one of the buses 110–117, and in that the drain of the input transistor is connected to a common ground. In each circuit 135–138, the sources of the output transistors are connected together to divide a current provided from the common positive voltage source by a bias transistor 149 having a gate receiving the bias voltage through the conductor 101. The components of the divided current are provided through the drain of the transistor 142 as a first or positive weighted digit position sum current 151 and through the drain of the transistor 147 as a second or negative weighted digit position sum current 152. As a result, each current pair 151 and 152 defines a differential signal representing the sum of the differential signal defined by the associated digit position sum currents 131 and 132 times the positional weight of the corresponding digit.

The FIG. 2 neuron body has a first or positive neuron sum component bus 155 and a second or negative neuron sum component bus 156, these buses extending through circuits 136–138. Bus 155 is connected to transistors 142 of these circuits so as to receive and arithmetically sum the current components 151 as a first or positive component 159 of a differential neuron sum signal, and bus 156 is connected to transistors 147 of these circuits so as to receive and arithmetically sum the current components 152 as a second or negative component current 159 of the neuron sum signal. It is apparent that the circuits 135–138 and buses 155 and 156 serve to generate the neuron sum signal from the differential digit position signals defined by currents 131 and 132.

Each bus 155 and 156 is connected through a diode connected FET 160 to the neuron common ground so as to drain the neuron sum signal currents 159 thereto. Transistors 160 function in a well-know manner to provide a current to voltage conversion effect similar to that of the FIG. 1 resistor 82, but provide for greater linearity of the connected circuits than does such a resistor. Oppositely of transistor 160 from the ground thereof, bus 155 has a connection to a positive analog voltage output signal connection 161 of the neuron, and bus 156 has a similar connection to a negative analog voltage output signal connection 162 of the neuron. It is evident that connections 161 and 162 provide a differential signal corresponding to the sum of the products of the each of the digit position sum signals defined by currents 131 and 132 and the positional values in the binary system corresponding to these digit position sum signals. As a result, the differential signal provided by connections 161 and 162 represent the sum of products of the input signals 12 and weights represented in the binary number system by the positions of switches 105 which receive the input signals.

Embodiment with Subtraction of Differential Signals

Figure 3:
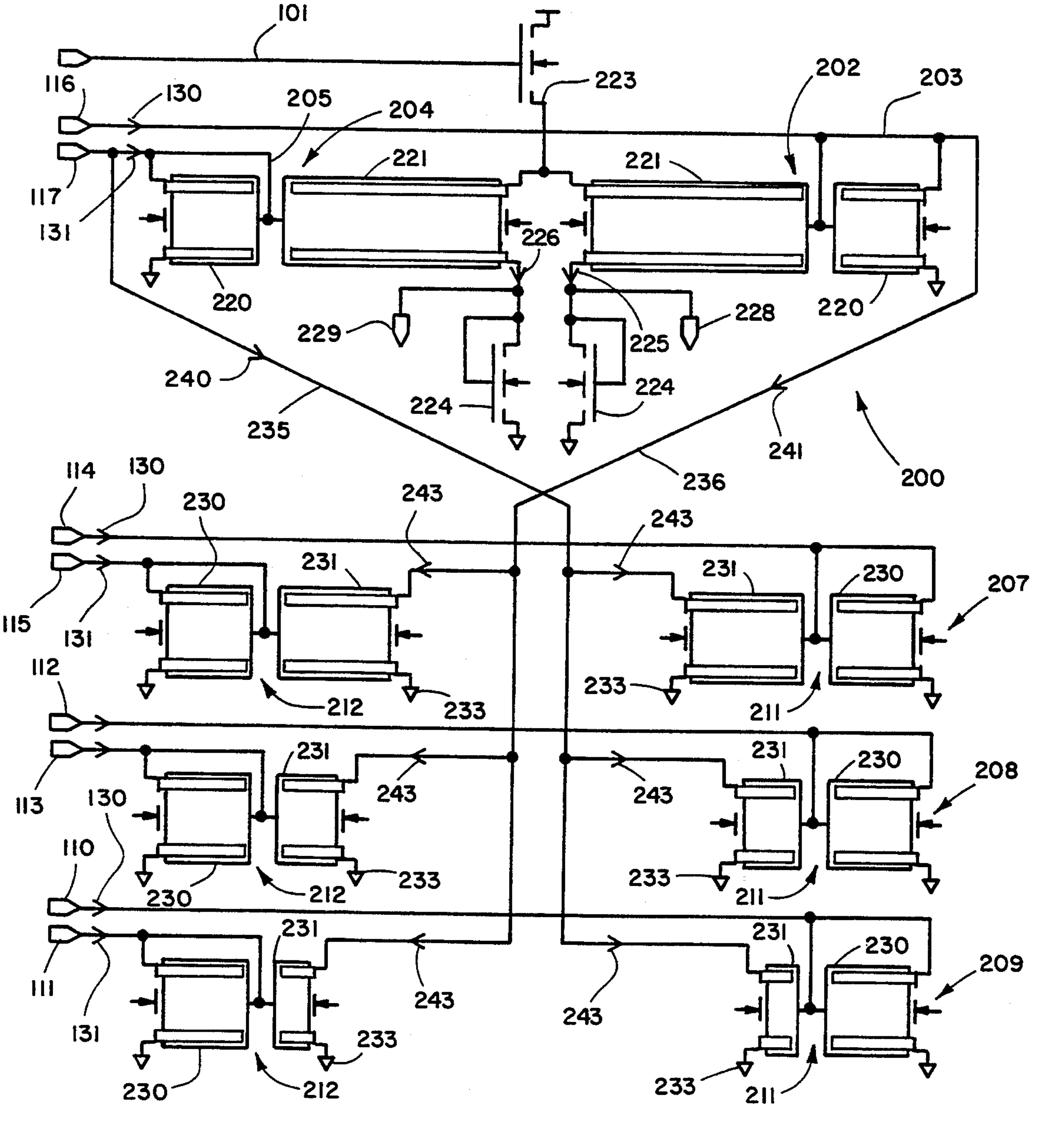
FIG. 3 is diagram of a binary weighting circuit embodying the principles of the present invention by subtracting a plurality of differential signal components corresponding to lesser significant digits from an opposite most significant digit component.

FIG. 3 is a diagram of a neuron body arrangement which may be substituted for that of the neuron body 15 of FIG. 2 and which provides the advantages thereof with fewer components by a feature of the present invention wherein differential signal components corresponding to lesser significant digits are subtracted from an opposite most significant digit component. Like the FIG. 2 neuron body, the FIG. 3 arrangement is connected to a bias voltage conductor 101 and to eight sum digit signal component buses 110–117 disposed in pairs 110 and 111, 112 and 113, 114 and 115, and 116 and 117 with first or positive component currents 131 of differential digit position sum signals being provided on buses 110, 112, 114, and 116 and with second or negative component currents 132 of these signals being provided on busses 111, 113, 115, and 117. In FIGS. 2 and 3, the pair of buses 116 and 117 are associated with a most significant bit position of the four binary digit weights provided by each synapse 11, and the bus pairs 114 and 115, 112 and 113, and 110 and 111 are each associated with successively lesser significant bit positions of such weights.

The FIG. 3 neuron body arrangement includes a most significant bit weighter 200 having a first or positive most significant component weighting current mirror 202, which receives the current 131 on bus 116 at a connection indicated by numeral 203, and has a second or negative most significant component weighting current mirror 204 which receives the current 132 on bus 117 at a connection indicated by numeral 205. The FIG. 3 arrangement includes three lesser significant bit weighters 207–209 associated with, respectively, the pair of buses 114 and 115, the pair of buses 112 and 113, and the pair of buses 110 and 111. Each weighter 207–209 has a first or positive lesser significant component weighting current mirror 211, which receives the current 131 on the corresponding bus 114, 112, or 110, and has a second or negative lesser significant component weighting current mirror 212 which receives the current 132 on the corresponding bus 115, 113, or 111.

In weighter 200 each current mirror 204 and 205 has an input FET 220 and an output FET 221. In each of these current mirrors, the gates of the input and output transistors are connected to each other, to the source of the input transistor, and to the corresponding bus connection 203 or 205; and the drain of the input transistor is connected to the common neuron ground. The sources of the output transistors of both current mirrors are connected together to divide a current provided from the common positive voltage source by a bias transistor 223 having a gate receiving the bias voltage through the conductor 101. The drains of output transistors 221 are each connected through a diode connected FET 224 to the neuron common ground so that the output transistor of positive current mirror 202 passes a first or positive most significant bit current 225 and the output transistor of negative current mirror 204 passes a second or negative most significant bit current 226. The drain of transistor 221 of current mirror 202 is connected to a positive analog voltage output signal connection 228 of the neuron, and the drain of transistor 221 of current mirror 204 is connected to a negative analog voltage output signal connection 229 of the neuron. As a result and as subsequently explained in greater detail, that currents 225 and 226 define, and connections 228 and 229 provide, a differential signal corresponding to the sum of the products of the each of the digit position sum signals defined by currents 131 and 132 and the positional values in the binary system corresponding to these digit position sum signals. The differential signal thus represents the sum of products of neuron input signals, such as signals 12, and any suitable binary synapse weights such as the weights represented by the positions of the FIG. 1 switches 105.

In the lesser significant bit weighters 207, 208, and 209, the positive current mirror 211 and the negative current mirror 212 each have an input FET 230 and an output FET 231. The gates of the input and output transistors are connected to each other, to the source of the input transistor, and to the corresponding bus 110–115; and the drain of the input transistor is connected to the common neuron ground. The drain of each output transistor 231 is also connected to this ground as indicated by numeral 233. A conductor 235 connects the sources of the output transistors of the three positive lesser significant current mirrors 211 to each other and to the connection 205 to bus 117 at the negative most significant current mirror 204, and a conductor 236 connects the sources of the output transistors of the three negative lesser significant current mirrors 212 to each other and to the connection 203 to bus 116 at the positive most significant current mirror 202.

In FIG. 3 and in a manner similar to that discussed in detail in connection with FIG. 1, the widths of the input transistors 220 and 230 are substantially the same for every current mirror 202, 204, 211, and 212, a representative and relative width of four arbitrary units being shown. However, the widths of the output transistors 221 and 231 are substantially proportional to the respective positional values—8, 4, 2, and 1—of the binary digit to which the current mirror corresponds. As a result and in accordance with the relative widths of the input and output transistors, these output transistors of weighters 200, 207, 208, and 209 pass, respectively, 200%, 100, 50% and 25% of the input currents to the corresponding input transistor 220 or 230. In each of the lesser significant bit input transistors 230 such input currents are the corresponding digit sum current signal 131 or 132. However, and at the most significant bit input transistors 220, a portion of the positive current signal 131 may be drained, as indicated by numeral 240, through the conductor 235 to the sources of the negative lesser significant output transistors; and a portion of the negative current signal 132 may be drained, as indicated by numeral 241, through the conductor 236 to the sources of the positive lesser significant output transistors. Each of the current mirror output transistors 231 drains a current 243 proportionally related to its corresponding input current 131 or 132 by the relative width of the output transistor to the corresponding input transistor.

It is, therefore, evident that current mirror 202 generates positive most significant bit signal current 225 so that current 225 may be proportional to the product of the component current 131 on bus 116 and the positional value of eight corresponding to the most significant bit position; and that current mirror 202 generates negative most significant bit signal current 226 so that this current 226 may be proportional to the product of the component current 132 on bus 117 and the positional value of eight. However, it is also evident that positive lesser significant current mirrors 211, by draining current 241 from bus 117, reduce current 226 proportionally to the products of the component currents 131 on buses 114, 112, and 110 and the associated positional value of four, two, or one of the lesser significant bit positions to which current mirrors 211 correspond. Similarly, it is evident that negative lesser significant current mirrors 212, by draining current 242 from bus 116, reduce current 225 proportionally to the products of the component currents 132 on buses 115, 113, and 111 and the positional values of four, two, or one to which current mirrors 212 correspond.

Figure 4A:
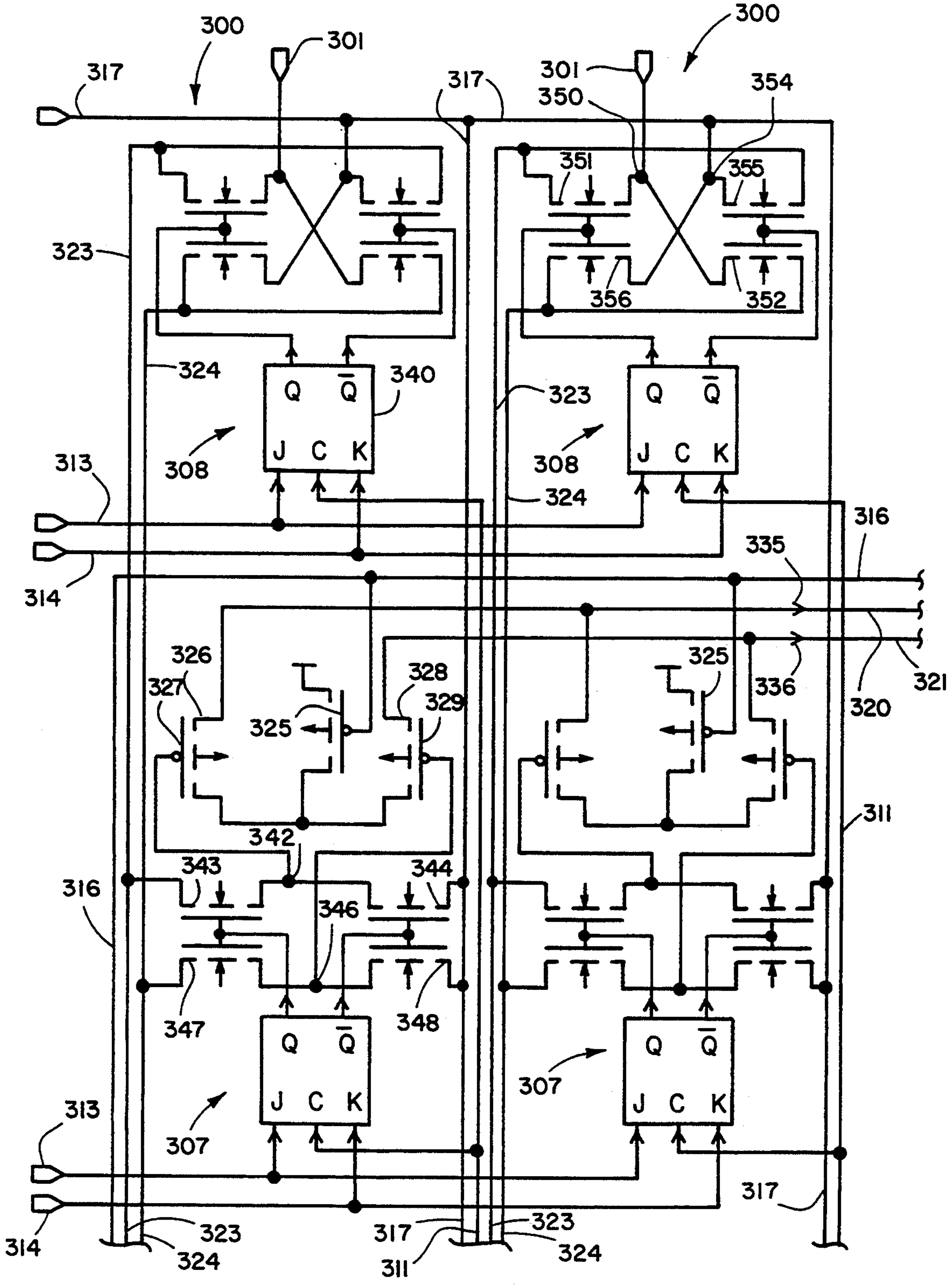
FIGS. 4A–4C are a diagram of an artificial neural network neuron embodying the principles of the present invention by subtracting one half of a differential signal digit component from the opposite next most significant component and by a synapse effecting binary sign and "one" or "zero" selection by switching of input and reference signals.
Figure 4B:
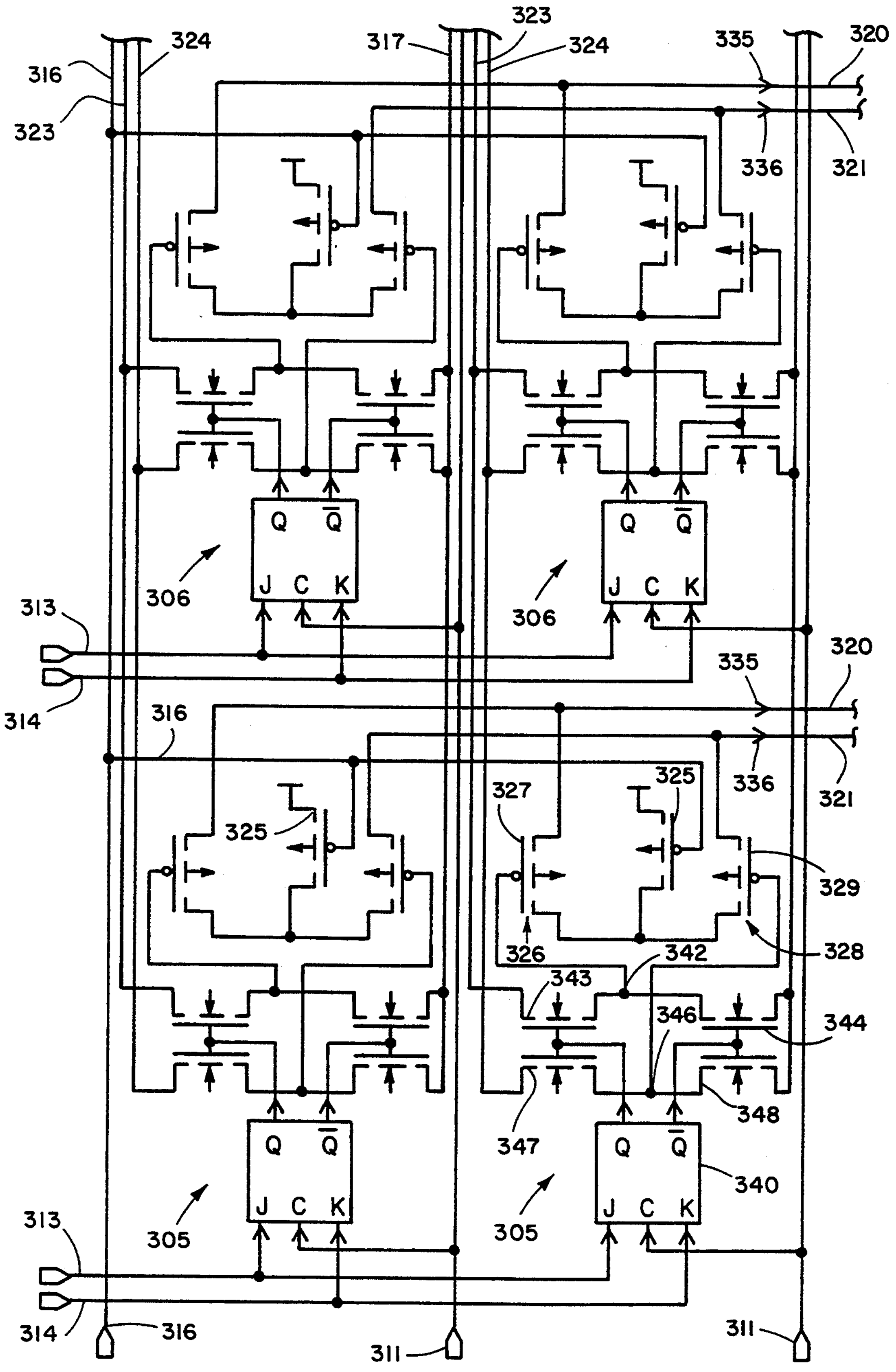
Figure 4C:
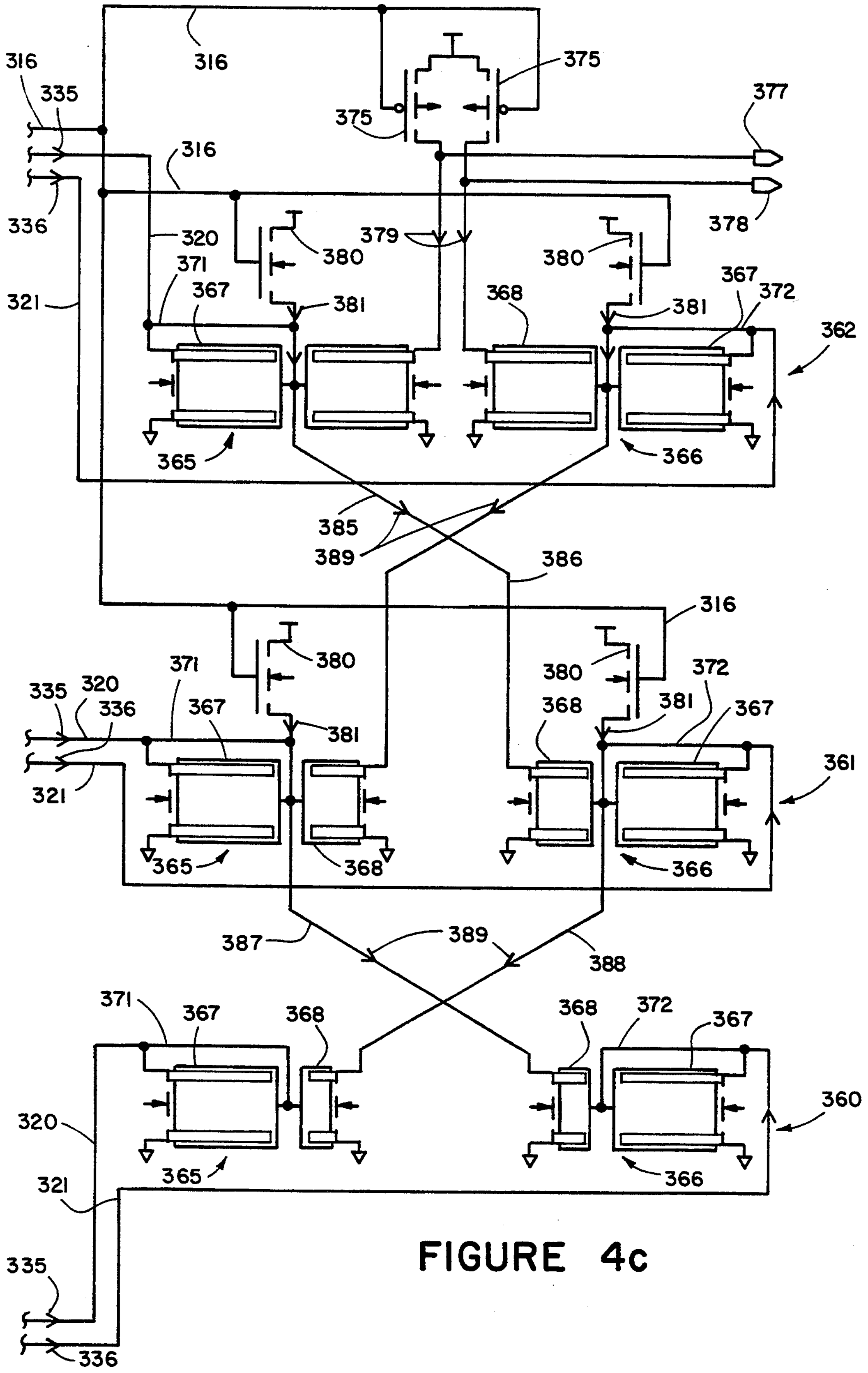

Embodiment with Subtraction from Next Most Significant Differential Signal and with Sign Selection FIGS. 4A–4C are a diagram of an artificial neural network neuron having the advantages of the FIG. 2 and FIG. 3 arrangements and having the further advantage of digit position weighting in accordance the present invention with the use of FET's of only two widths by subtracting half of a differential signal components from an opposite next most significant digit component. The FIGS. 4 neuron also provides sign selection in accordance with the present invention by the switching of input and reference signals and is adapted for convenient such sign switching, as well as changing of binary weights, during operation. The FIGS. 4 elements use p-channel FET's as well as the n-channel FET's depicted in FIGS. 1–3, and it will be apparent to one skilled in the art of electronic design that the principles of the present invention shown in Figs. 1–3 may also be embodied in circuits using both n-channel and p-channel FET's.

The FIGS. 4 neuron has a synapse section with two representative synapses 300 each having an input analog voltage signal connection 301. Each synapse is represented with magnitude bit weighting sections, enumerated 305–307 in order of least to most significance, and has a sign bit weighting section 308. Each of the sections of a synapse receives the corresponding the input signal, and the sections 305–307 receive, through a conductor 311, a synapse selection voltage signal. Each pair of the sections 305÷308 receive a set voltage signal on a conductor 313 and receive a reset voltage signal through a conductor 314, the synapse and bit selection signals being provided to the neuron in any suitable manner when a bit represented in the synapse is to be changed. The FIGS. 4 neuron has a bias voltage conductor 316 extending through the neuron and has a reference voltage signal conductor 317 extending through the synapse sections 305–308. The neuron has three first or positive digit summing conductors 320 and three second or negative digit summing conductors 321. These conductors are disposed with one conductor 320 and one conductor 321 extending through each pair of the magnitude sections corresponding to the same bit position. Each synapse has a first source conductor 323 and a second source conductor 324, these conductors extending from the sign bit section 308 of the synapse through its magnitude bit sections 305–307.

All of the magnitude sections 305–307 are substantially identical, and each has a bias transistor 325 having its gate connected to conductor 316 and providing a current from a common positive source of the neuron. This current is divided through a first or positive synapse digit multiplying transistor 326 having a gate 327 and a second or negative synapse digit multiplying transistor 328 having a gate 329. The currents from transistors 326 are provided to and summed on the corresponding bus 320 as a first digit sum component current indicated by numeral 335, and the currents from transistors 328 are provided to and summed on the corresponding bus 321 as a second digit sum component current indicated by numeral 336.

Each section 305–308 includes the function of a JK flip-flop 340 for switching the section to selectively provide a "one" weight or a "zero" weight. This flip-flop is arranged in the conventional manner with its "J" "K" and "C" terminals connected, respectively, to the corresponding set conductor 3 13, reset conductor 314, and synapse selection conductor 311 so as to energize a "Q" terminal of the flip-flop when the weight is to represent a one bit and a "not Q" terminal when the weight is to represent a zero bit.

Each magnitude bit section 305–307 has a point 342 connected to gate 327 of multiplying transistor 326, to the corresponding first source conductor 323 by a switching FET 343, and to the reference voltage conductor 317 by a switching FET 344; and has a point 346 connected to gate 329 of multiplying transistor 328, to the corresponding second source conductor 324 by a switching FET 347, and to the reference voltage conductor 317 by a switching FET 348. The gates of transistors 343 and 347 are connected to the "Q" terminal of flip-flop 340 and the gates of transistors 344 and 348 are connected to the "not Q" terminal. As a result and when a section 305–308 is in a condition corresponding to a "one" magnitude bit, the section effectively switches the first source conductor to the corresponding first summing conductor 320 and switches the second source conductor to the corresponding second summing conductor 321. Similarly and when the section is in a condition corresponding to a "zero"T magnitude bit, the section effectively switches both summing conductors to the reference voltage conductor.

Each sign bit section 308 has a point 350 connected to the corresponding input signal connection 301 and to the sources of a switching FET 351 and a switching FET 342, and has a point 354 connected to the reference voltage conductor 317 and to the sources of a switching FET 355 and a switching FET 346. The drains of transistors 351 and 355 are connected to the first source conductor 323, and the drains of transistors 352 and 356 are connected to the second source conductor 324. The gates of transistors 351 and 356 are connected to the "Q" terminal of flip-flop 340 and the gates of transistors 352 and 357 are connected to the "not Q" terminal. When a section 308 is in a condition corresponding to a "one" sign bit, the section thus switches the input signal directly to the corresponding first source conductor 323 and switches the reference voltage directly to the corresponding second source conductor 324. However and when the section is in a condition corresponding to a "zero" sign bit, the input signal is switched directly to the first source conductor and the reference voltage is switched directly to the second source conductor.

It is evident from the above description of the FIGS. 4 neuron that, as with the FIG. 2 neuron, each section 305–307 corresponding to a magnitude bit position of a synapse 300 provides a differential signal having the first component 335 on the corresponding conductor 320 and the second component 336 on the corresponding conductor 321. It is also evident that, as with the FIG. 2 neuron, a zero value of a bit position is represented by these first and second components corresponding to the reference voltage on conductor 317 since transistors 344 and 348 connect the reference voltage to the gates of both the positive component multiplying transistor 326 and the negative component multiplying transistor 328. It is further evident that, as with the FIG. 2 neuron, the FIGS. 4 neuron provides for representation of a "one" at a bit position by one of these first or second components corresponding to the input signal and by the other of these components corresponding to the reference voltage signal, this representation resulting from a section 308 switching one of these signals to conductor 323 and the other to conductor 324 and from the signals on conductors 323 and 324 being switched to the gates of transistors 326 and 328, when a section 305–307 is in the one condition. However and unlike the FIG. 2 neuron, the FIGS. 4 neuron provides sign selection for signed magnitude binary weights of each synapse 300 since a component corresponding to an input signal at connection 301 is provided to one of the summing conductors 320 or 321 when the sign bit section 308 is in a "zero" condition and is provided to the other of the summing conductors when the sign bit section is in a "one" condition.

The FIGS. 4 neuron body arrangement includes a least significant magnitude bit weighter 360, an intermediate magnitude bit weighter 361, and a most significant magnitude bit weighter 362 corresponding, respectively, to the synapse sections 305–307 and receiving therefrom on the associated conductors 320 and 321 the corresponding first digit sum component currents 335 and second digit sum component currents 336. It will be subsequently apparent that digit position weighting in accordance with FIGS. 4 may be extended to more that three bits by the use of additional weighters corresponding to intermediate weighter 361.

Each weighter 360–362 has a first or positive current mirror 365 and a second or negative current mirror 366; each current mirror 365 and 366 has an input FET 367 and an output FET 368; and the drains of these FET's are each connected to a common ground of the neuron. Each positive current mirror 365 has the usual connection 371 between the source of its input transistor and the gates of both the input and the output transistor, this connection receiving the corresponding positive component current 335. Similarly, each negative current mirror 366 has a connection 372 between the source of its input transistor and the gates of its input and the output transistors, and this connection receives the corresponding negative component current 336. Weighters 360–662 have additional elements and connections which are different in the different weighters and will now be described.

In weighter 362, a pair of bias transistors 375 have their gates connected to the bias voltage conductor, their sources connected to the common positive source of the FIGS. 4, neuron, and their drains individually connected to the positive current mirror 365 and to the negative current mirror 366 at the sources of the output transistors 368. A positive analog voltage output signal terminal 377 of the neuron is connected between the output transistor of the positive current mirror 365 and its associated bias transistor 375, and a negative analog voltage output signal terminal 378 is similarly connected at the negative current mirror 365. The bias transistors 375 provide currents indicated by numerals 379, and these currents define a differential signal subsequently described in greater detail and provided in voltage form at connections 377 and 378.

Weighters 361 and 362 each have a pair of bias transistors 380 arranged with their gates connected to conductor 316 and their sources connected to the common positive source, the drain of one transistor 380 being connected to conductor 371 of the positive current mirror 365 and the drain of the other transistor 380 being connected to conductor 372 of the negative current mirror 366. Bias currents indicated by numerals 381 are provided by transistors 380 to conductors 371 and 372 of each weighter 361 or 362. However, these bias currents are substantially equal and thus do not affect the differential signals provided to and generated by the weighters. Weighter 360 lacks this bias transistor arrangement of weighters 361 and 362.

The FIGS. 4 feature of providing digital weighting by subtracting half of a differential signal component from an opposite next most significant digit component is provided by two arrangements now to be described. First, the two input FET's 367 and the two output FET's 368 of weighter 362 for the most significant bit have the same width, and the two input FET's 367 of each of the weighters 361 and 360 for the lesser significant bits have this same width. However, the output FET's 368 of each of the lesser significant bit weighters 360 and 361 have a width which is one half of such width of all of the input FET's and of the most significant bit weighter output FET's. Second, a drain conductor 385 connects conductor 371 of the positive current mirror 365 of the most significant bit weighter 362 to the source of the relatively narrow output FET 368 of the negative current mirror 366 in the intermediate bit weighter 361. Also, drain conductor 386 connects conductor 372 of the negative current mirror 366 of weighter 362 to the source of the relatively narrow output FET of the positive current mirror 365 in the intermediate bit weighter 361. Similar drain conductors 387 and 388 are provided, respectively, between the positive current mirror 365 of intermediate bit weighter 361 and the negative current mirror 366 of the least significant bit weighter 360 and between the negative current mirror 366 of intermediate bit weighter 361 and the positive current mirror 365 of the least significant bit weighter 360. Conductors 385–388 may each conduct a current indicated by numeral 389.

It is evident that each of the positive current mirrors 365 may generate the corresponding current 379 or 389 as a first bit current proportional to the first or positive digit sum current 335 received by the current mirror and that each of the negative current mirrors 366 may generate the corresponding current 379 or 389 as a second bit current proportional to the second or negative digit sum current 336 received by the current mirror. Since the input transistors 367 and the output transistors 368 are the same width in the most significant bit weighter 362, currents 379 are substantially the same as the corresponding current 335 or 336 in the absence of currents 389 from weighter 362 to weighter 361. However and due to the relative widths of transistors 367 and 368 in the lesser significant bit weighters 361 and 360, currents 389 thereto are substantially one half of the corresponding current 335 or 336 to weighter 360 and, in the absence of currents 389 from weighter 362, substantially one half of the corresponding current 335 or 336 to weighter 361. As a result, negative current mirrors 366 of weighters 361 and 360 serve to reduce such first bit currents of weighters 362 and 361 by one half of the corresponding such second bit current of weighter 361 or 360. Similarly, positive current mirrors 365 of weighters 361 and 360 serve to reduce such second bit currents of weighters 362 and 361 by one half of the corresponding such first bit current of weighter 361 or 360.

It is apparent that the current mirrors of weighters 361 and 360 thus function to reduce such first bit currents corresponding to each magnitude bit position, except such first bit currents corresponding to the weighter 360 least significant bit position, by a reduction effectively equal to one half of such first bit current at the next lesser significant bit position. As a result, such first bit current for the positive current mirror 365 of most significant weighter 362 and the corresponding such reduction by the associated current 389 on conductor 385, together with such second bit current for the negative current mirror 366 of weighter 360 similarly reduced by the current on conductor 386, generate the above-mentioned differential signal components defined by currents 379.

It can be seen that one of the differential signal currents 379, the one which positive current mirror 366 of most significant weighter 362 would generate if this most significant current were equal to the current 335 to this positive current mirror, is reduced by the conductor current 385 which is one half of the current the negative current mirror 367 of intermediate significant weighter 361 would generate if this conductor 385 current were equal to such current to this negative current mirror. However, the current which the weighter 361 negative current mirror would conduct is, in turn, reduced by the current on conductor 387 which is one half the current 335 to the positive current mirror 366 of least significant weighter 360. As a result, the current generated by the most significant bit positive current mirror is, in effect, increased by one-fourth the current to the least significant bit positive current mirror. It can also be seen that the other of the currents 379, the current which negative current mirror 367 of the most significant weighter would generate if this most significant current were equal to current 336 to this negative current mirror, is reduced by one half the conductor 386 current which the positive current mirror 366 of intermediate significant weighter 361 would generate if this conductor 386 current were equal to the current 336 to this negative current mirror. As a result of the differential nature of the signals defined by currents 379, this decrease of half a negative current 336 is effectively the same as an increase of half of the corresponding positive current 335.

It is thus apparent that the differential signal defined by currents 379 corresponds to the sum of the products of each of the digit position sum signals defined by currents 335 and 336 and the binary system positional values of 1, 2, and 4 corresponding, respectively, to the weighters 360–362. This differential signal thus represents the sum of products of neuron input signals, such as signals at connection 301, and the binary synapse weights represented by the conditions of flip-flops 340 of the magnitude bit sections of synapses 300.

Obviously, many modifications and variations of the present invention are possible in light of the above teachings. It is, therefore, to be understood that the present invention may be practiced within the scope of the following claims other than as described herein.

What is claimed is:

1. A neuron for an artificial neural network receiving a plurality of input signals representing values in a predetermined range, the neuron weighting each of the input signals by weight digits corresponding to numerals at digit positions in a predetermined number system and comprising:

a plurality of synapses, each of said synapses receiving one of said input signals and having a plurality of synapse digit weighting means, which correspond individually to said digit positions and which store single digit weight values corresponding to said numerals, for generating synapse digit position signals individually corresponding to the products of each of the values of single digit weight values and said one input signal a plurality of digit summing means, which correspond individually to said digit positions and which receive the synapse digit position signals generated by the synapse digit weighting means corresponding to the same digit positions as the digit summing means, for providing digit position sum signals representing the sums of the synapse digit position signals corresponding to each of said digit positions; and digit position weighting means for receiving said digit position sum signals and for generating therefrom a neuron sum signal corresponding to the sum of the products of each of said digit position sum signals and the positional value in said number system of the digit position corresponding to the digit position sum signal, whereby said neuron sum signal represents the sum of the products of the values of each of said input signals and a weight represented in said number system by the weight digits of the synapse receiving the input signal.

2. The neuron of claim 1 wherein said number system is the binary system so that said single digit signals correspond to either a zero value or the value of said one of the input signals and so that said positional value is a power of the integer two.

3. The neuron of claim 2 wherein each of said synapse digit weighting elements comprises switch means for selecting a signal representing said zero value when the corresponding stored signal weight value represents "zero" and for selecting said one of said input signals when the corresponding stored signal weight value corresponds to "one".

4. The neuron of claim 1 wherein said input signals are analog signals and each of said synapse digit weighting elements comprises means for multiplying said one of said input signals by a selected one of a plurality of factors corresponding to each of the numerals in said number system so as to generate the corresponding said synapse digit position signal.

5. A neuron for an artificial neural network receiving a plurality of input signals representing values in a predetermined range, the neuron weighting each of the input signals by binary weight digits in a predetermined number of binary digit positions and comprising:

a plurality of synapses, each of said synapses receiving one of said input signals and having a plurality of synapse digit weighting means, which correspond individually to said binary digit positions, for generating synapse digit position signals having a predetermined zero value when a weight digit at a corresponding binary digit position is "zero" and having a value corresponding to the value of said one of said input signals when said weight digit is "one";

a plurality of digit summing means, which correspond individually to said digit positions and which receive the synapse digit position signals generated by the synapse digit weighting means corresponding to the same digit positions as the digit summing means, for generating digit position sum signals representing the sums of the synapse digit position signals corresponding to each of said digit positions; and digit position weighting means for receiving said digit position sum signals and for generating therefrom a neuron sum signal corresponding to the sum of the products of each of said digit position sum signals and the positional values of the binary digit positions corresponding to the digit position sum signals, so that said neuron sum signal corresponds to the sum of the products of the values of each of said input signals and weights represented by the binary weights digits of the synapses receiving the input signals.

6. The neuron of claim 5 wherein:

said synapse digit weighting means generate the corresponding synapse digit position signals as currents varied in a predetermined manner to represent said zero value and the values of said input signals;

each of said digit summing means is a conductor receiving said currents from every synapse digit weighting means corresponding to the same digit position as the digit summing means so that each of said digit sum position signals is substantially the arithmetic sum of said synapse digit position signals; and said digit position weighting means has a plurality of positional weighting means, which correspond individually to said digit sum position currents, for receiving the corresponding digit sum position currents and for generating therefrom weighted digit position currents proportional to the products of the corresponding digit sum position signal currents and the positional values of the corresponding binary digits; and means for substantially arithmetically summing said weighted digit position currents as said neuron sum signal.

7. The neuron of claim 6 wherein in said plurality of positional weighting means:

each of said means includes a first field effect transistor receiving the corresponding digit sum position current and a second field effect transistor connected in current mirror relation to said first transistor and determining the corresponding weighted digit position current;

the effective width of said first transistor is substantially the same in every positional weighting means; and the effective width of said second transistor is proportional to the positional value of the binary digit corresponding to each positional weighting means.

8. The neuron of claim 5 wherein:

each of said synapse digit weighting means generates the corresponding synapse digit position signal as a differential signal having a first component and a second component;

each of said digit summing means includes a first component summing means, which extends through said synapses and receives said first component of every synapse digit weighting means corresponding to the same digit position as the digit summing means, for generating a first sum component corresponding to the sum of the first components of the corresponding synapse digit position signal, and a second component summing means, which extends through said synapses and receives said second component corresponding to said same digit position as the digit summing means, for generating a second sum component corresponding to the sum of the second components of the corresponding synapse digit position signal; said digit sum position signals are differential signals defined by said first sum component and said second sum component; and said digit position weighting means generates said neuron sum signal from said differential signals.

9. The neuron of claim 8 wherein:

said first sum component and said second sum component are currents varied in a predetermined manner to represent said zero value and the values of said input signals;

said first summing means and said second summing means of each of said plurality of digit summing means are conductors receiving said currents so that said digit sum position signals are differential signals defined by first digit sum component currents, which are substantially the arithmetic sum of the first sum components corresponding to said same digit positions, and by second sum digit sum component currents which are substantially the arithmetic sums of the second sum component currents corresponding to said same digit positions; and said digit position weighting means has a plurality of positional weighting means, which correspond individually to said digit positions and receive the corresponding first and second digit sum component currents, for weighting said sum component currents proportionally to the positional values of the corresponding binary digits for use in generating said neuron sum signal.

10. The neuron of claim 9 wherein said digit positions include a most significant bit position and a plurality of lesser significant bit positions and wherein said plurality of positional weighting means corresponding to said digit positions include:

a first most significant bit weighting means, which receives the first digit sum component current corresponding to said most significant bit position, for generating a first most significant bit current proportional to the product of said first digit sum component current and the positional value of the most significant bit position;

a second most significant bit weighting means, which receives the second digit sum component current corresponding to said most significant bit position, for generating a second most significant bit current proportional to the product of said second digit sum component current and the positional value of the most significant bit position;

a plurality of first lesser significant bit weighting means, which receive the first digit sum component currents corresponding to said lesser significant bit positions, for reducing said second most significant bit current proportionally to the product of the received first digit sum component current and the positional value of the corresponding lesser significant bit position; and a plurality of second lesser significant bit weighting means, which receive the second digit sum component currents corresponding to said lesser significant bit positions, for reducing said first most significant bit current proportionally to the product of the received first digit sum component current and the positional value of the corresponding lesser significant bit position, so that said first most significant bit current reduced by said plurality of second lesser bit significant weighting means is a first differential component of said neuron sum signal, and said second most significant bit current reduced by said plurality of first lesser bit significant weighting means is a second differential component of said neuron sum signal component.

11. The neuron of claim 9 wherein said digit positions include a most significant bit position and a least significant bit position and wherein said plurality of positional weighting means include:

first bit weighting means for receiving the corresponding first digit sum component currents and for generating first bit currents proportional to said first digit sum component currents;

second bit weighting means for receiving the corresponding second digit sum component currents and for generating second bit currents proportional to said second digit sum component currents;

means for reducing the first bit current corresponding to each bit position except the least significant bit position by a reduction effectively equal to one half of the second bit current corresponding to the next lesser significant bit position; and means for reducing the second bit current corresponding to each bit position except the least significant bit position by a reduction effectively equal to one half of the first bit current corresponding to the next lesser significant bit position, so that the first bit current and the corresponding such reduction for the most significant bit position define a first differential component of said neuron sum signal, and the second bit current and the corresponding such reduction for the most significant bit position define a second differential component of said neuron sum signal component.

12. The neuron of claim 5 wherein the neuron includes:

a plurality of first digit summing conductors corresponding individually to said digit positions and extending through the synapse digit weighting means corresponding to the same digit position, and a plurality of second digit summing conductors corresponding individually to said digit positions and extending through the synapse digit weighting means corresponding to the same digit position, and wherein in each of said synapses:

said plurality of synapse digit weighting means includes a sign bit digit weighting means, and a plurality of magnitude bit digit weighting means;

said sign bit weighting means receives the one of said input signals corresponding to the synapse, and a reference signal;

each of said magnitude bit digit weighting means receives said reference signal;

the synapse has a first source conductor extending from said sign bit weighting means to each of said magnitude bit weighting means, and a second source conductor extending from said sign bit weighting means to each of said magnitude bit weighting means;

said sign bit weighting means switches said one input signal to said first source conductor and switches said reference signal to said second source conductor when a bit corresponding to said sign bit weighting means is "zero" and switches said one input signal to said second source conductor and switches said reference signal to said first source conductor when a bit corresponding to said sign bit weighting means is "one"; and each of said magnitude bit weighting means switches said first source conductor to said first summing conductor and switches said second source conductor to said second summing conductor when a bit corresponding to the magnitude bit weighting means is "one", and switches said reference signal to said first summing conductor and to said second summing conductor when a bit corresponding to the magnitude bit weighting means is "zero", so that:

each of said digit position signals is a differential signal having a first component on the corresponding first digit summing conductor and having a second component on the corresponding second digit summing conductor;

each of said digit position signals has a zero value represented by both of said components corresponding to said reference signal;

each of said digit position signals has a one value corresponding to the value of said input signal and represented by one of said components corresponding to said input signal and the other of said components corresponding to said reference signal; and said component corresponding to the value of said input signal is on one of said summing conductors when a bit corresponding to said sign bit weighting means is "zero" and is on the other of said summing conductors when a bit corresponding to said sign bit weighting means is "one".

* * * * *